Nov. 7, 1950  P. H. ROYSTER  2,528,553
PROCESS OF MAGNETIC ROASTING
Filed Nov. 19, 1946
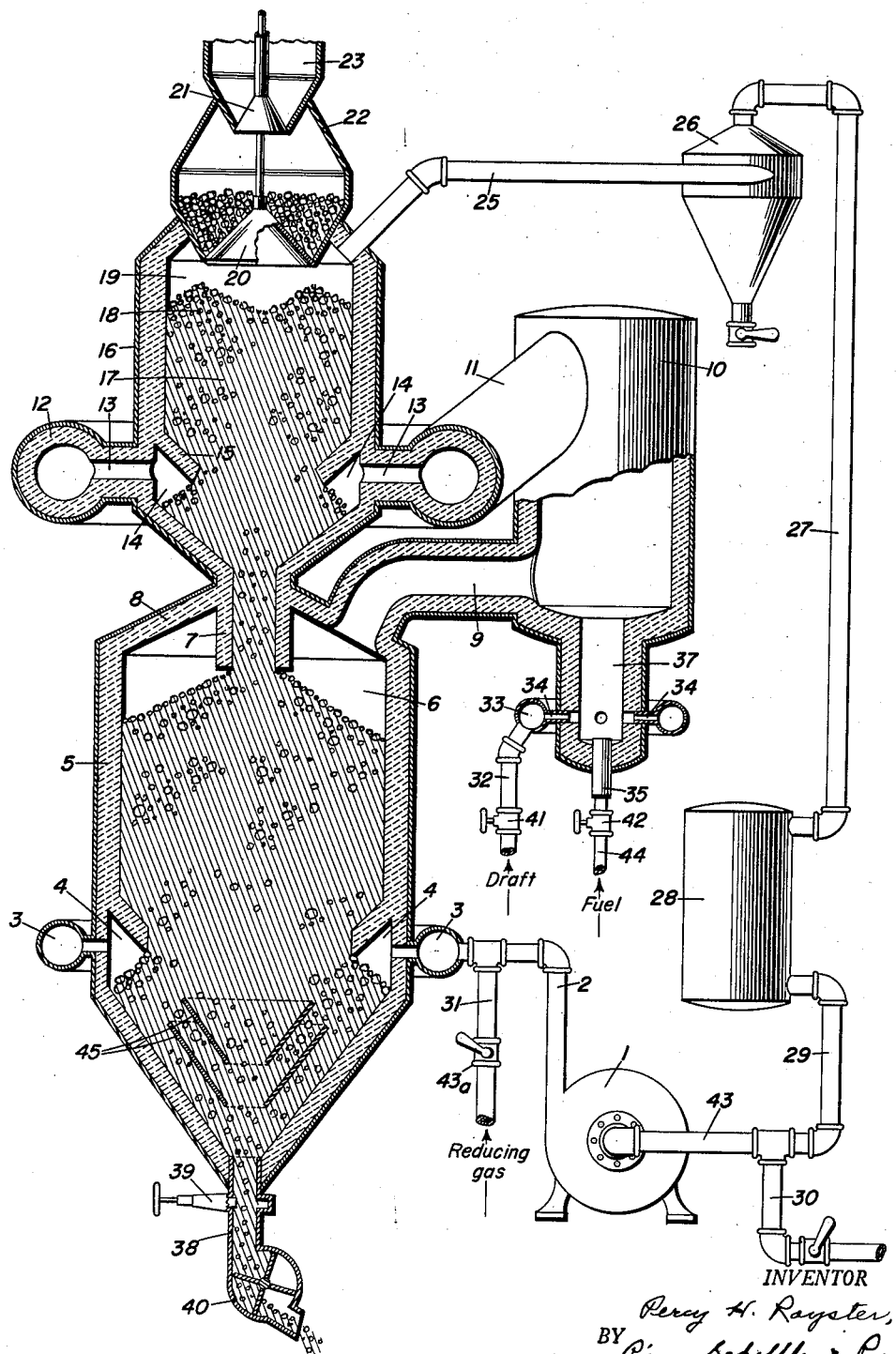
INVENTOR
Percy H. Royster,
BY Pierce, Scheffler & Parker
his Attorneys Patented Nov. 7, 1950

2,528,553

UNITED STATES PATENT OFFICE 2,528,553

PROCESS OF MAGNETIC ROASTING

Percy H. Royster, Chevy Chase, Md., assignor to Pickands Mather & Co., Cleveland, Ohio, a copartnership Application November 19, 1946, Serial No. 710,747

3 Claims. (Cl. 75—1)

This invention relates to the magnetic roasting of ferruginous ores and ore material initially containing substantial amounts of relatively non-magnetic oxidic compounds of iron. The invention concerns a development related to the process described in my copending application Serial No. 695,914, filed September 10, 1946, of which the present application is a continuation-in-part. In particular, the present invention is concerned with an improved process and apparatus for thermal treatment of iron ores as a preliminary step in the magnetic concentration thereof.

It is an object of the present invention to provide a thermally efficient and economic method for magnetically roasting low grade iron ores, and other related minerals, e. g., manganiferous iron ores, non-metallurgical chrome ores and other ores commonly designated as "ferrous," the iron contents of which are relatively non-magnetic. The primary objective of the heat treatment herein proposed is to render naturally non-magnetic minerals adaptable to magnetic concentration. In attaining this objective, I propose to remove not more than one-ninth of the oxygen occurring in ferric oxide. That is to say, I propose to reduce the initial ferric oxide largely to magnetite with the specific provision, however, that I cause a minimum of "over reduction"—by which term I mean the carrying of the reduction to a lower state of oxidation than $Fe_3O_4$—i. e., to produce as little as possible FeO or metallic ("sponge") iron.

According to the present invention, a body of the mineral is caused gravitationally to descend through a first chamber and a second chamber in series. In its descent through the first chamber, the mineral is dehydrated and brought up to reactive temperature, and thereupon all or substantially all of its content of relatively non-magnetic oxidic compounds of iron is reduced to magnetite by means of a current of reactive gas (the composition of which will be described hereinafter), passed countercurrently through the body of mineral. The hot mineral discharged from the first chamber is passed to the second, wherein during its descent therethrough the hot mineral is cooled by means of a countercurrently moving initially relatively cool current of the aforesaid gas. Preferably, the aforesaid first and second chambers are the upper and lower chambers of a substantially vertical shaft furnace—generally similar to that described and illustrated in my copending application Serial No. 605,861—characterized by an intermediate zone of reduced cross-sectional area communicating between the upper and lower chambers.

It is an essential feature of the present invention that the furnace structure is so arranged that a large part of the gas after its upward passage through the lower chamber is diverted from the latter and is caused to traverse a combustion chamber wherein fuel combustion is maintained and heat is imparted to the gas stream, after which "thermal boosting" the gas is introduced adjacent the bottom of the upper chamber and passes upwardly in countercurrent thermal and chemical relationship with the ore materials descending therethrough.

A significant feature of the present process is the realization of "thermodynamically restrained" reduction. The ferric oxide content of the mineral is subjected to chemical interaction with a reactive gas, the composition of which is carefully controlled to present concentrations of $CO_2$, CO, $H_2$, and $H_2O$ in such proportions that the only thermodynamically stable phase in the quaternary system Fe—C—H—O is $Fe_3O_4$. When I start, therefore, with ferric oxide, the reducing action of the reactive gas can convert $Fe_2O_3$ into $Fe_3O_4$ only, and "over reduction" to form FeO and Fe is chemically impossible regardless of the amount of reactive gas employed, the temperature of the gas or the time and intimacy of the contact between the gas and solid. In order to achieve this desired result, a large portion of the gas discharging from the first or upper chamber (after passage through the two chambers in series) after the removal of suspended dust, the condensation of excess moisture and cooling, is caused to re-enter the system adjacent the bottom of the lower chamber. I: (1) bleed to waste a part of this discharged gas, (2) introduce into it a controlled amount of reducing gas whereby to produce an "enriched carrier gas," which I force upwardly through the lower chamber; (3) remove the major portion of the gas after passage through the lower chamber and transfer it into a combustion chamber into which (4) I inject a suitable fuel, e. g., oil, natural gas, powdered coke, blast furnace gas, coke-oven gas, or other industrial fuel, while at the same time (5) introducing a restricted amount of draft air, controlled in amount to provide, as nearly as possible, just enough oxygen to convert the combustibles of the fuel into $CO_2$ and $H_2O$ without causing a residual excess remanent amount of oxygen; and (6) re-introduce this gas from the combustion chamber into the bottom of the upper chamber.

The mode of, and an apparatus adapted to the, carrying out of the above described process will readily be undersood by reference to the following specific description taken in conjunction with the appended drawing, which is a diagrammatic representation, partially in section, of the preferred system of apparatus. The recirculating carrier gas is forced by motor-driven blower 1, into which it is admitted by conduit 43, through cold gas inlet conduit 2 into bustle pipe 3 surrounding the second or lower reaction chamber 5. Reducing gas, in amount controlled by the proper setting of valve 43a, enters inlet conduit 2 by way of conduit 31 from a source (not shown) of such reducing gas, commingling with the recirculating carrier gas to constitute the "enriched carrier gas" before its entrance into bustle pipe 3. A plurality of openings spaced circumferentially about chamber 5 permits the flow of enriched carrier gas from bustle pipe 3 into annular open space 4 within chamber 5, from which latter space the gas flows into the column of ore descending through 5, and passes upwardly therethrough. Chamber 5 is so constructed as to provide an open space 6 at its top, which space 6 serves as a gas-collecting space to receive the gas passing upwardly through the ore column in chamber 5. The gas flows from space 6 through transfer conduit 9 into combustion chamber 10 wherein its temperature is raised in suitable amount through the combustion of fuel therein. The resulting thermally enhanced enriched carrier gas discharges from combustion chamber 10, through conduit 11 into bustle pipe 12 positioned around upper chamber 16 adjacent the bottom of the latter. A plurality of circumferentially spaced, thermally insulated blow pipes 13, 13 permit the entrance of gas from bustle pipe 12 into open space 14 positioned annularly about the lower perimeter of chamber 16. The resulting "spent gas" passing from 17 traverses the stockline 18 at the top of column 17, enters open space 19 maintained at the top of, and serving as a gas-collecting space in, chamber 16.

The spent carrier gas discharges from space 19 by way of exhaust main 25; is stripped of entrapped solids (e. g., dust and fume) in passage through dust collector 26; and is transported through clean-gas line 27 into cooler or scrubber 28 wherein its temperature is reduced and excess moisture is removed. In treating ores which produce a large amount of extremely fine dust, it is or may be advantageous to install a Cottrell electrostatic precipitator in the return gas circuit 25, 26, 27, 28, and 29.

Cool, clean, spent carrier gas from scrubber 28 is carried through conduits 29 and 43 to the inlet of blower 1. A sufficient amount of the gas is bled through valved bleed-line 30 to maintain continuously uniform pressures throughout the closed circuit.

The composition of the spent gas passing through cold gas main 2 generally exhibits a $CO_2$ content in the neighborhood of 20 to 25%. After passage through chamber 5, the gas exhausting through conduit 9 contains large amounts of $CO_2$ and $H_2O$ which tend to "smother" combustion in chamber 10. With an excellently designed burner provided for effecting combustion of the fuel with the draft introduced into combustion chamber 10, regular combustion is possible. In many cases I recommend, however, that the burner 35 be located in a shielded portion 37 of combustion chamber 10 whereby to permit combustion to take place in "auxiliary chamber" 37. According to this recommended practice, I introduce draft air through draft main 32 into bustle pipe 33 from which the draft is conveyed through the plurality of conduits 34, 34 into the "auxiliary chamber" 37. Fuel is introduced into auxiliary chamber 37 by means of water-cooled burner 35. The relative amounts of fuel and draft air forced into auxiliary chamber 37 are carefully controlled by regulating the opening of draft valve 41 and the opening of fuel valve 42 whereby, as exactly as possible, just sufficient draft oxygen is introduced to effect the perfect combustion of the fuel. I prefer to employ an automatic control of these two valves actuated by orifices (not shown) positioned in draft main 32 and fuel main 44.

The ore material to be magnetically roasted is charged into hopper 23 of the double bell-and-hopper feed equipment illustrated at top of chamber 16. By opening the little bell 21 charge material is introduced into gas seal 22, wherein it rests on the big bell 20. At suitable frequent intervals bell 20 is lowered, permitting the material in the gas seal to fall on the stockline 18 of the charge column 17 in chamber 16. The big and little bells and gas seal illustrated in the drawings are of the type conventionally employed in blast furnace practice. I contemplate, in many instances, using in lieu of the illustrated bell-and-hopper feed equipment any one or more of the conventional types of charging equipment employed in gas producers, which may variously be chain conveyors, belt conveyors, rotating disks, star-gates, or the like.

In describing the column of charged material contained in chambers 5 and 16 as "continuously descending" I construe the latter term specifically to include, of course, a downward motion of these charge columns taking place intermittently in recurrent steps, since the overall effect of such interrupted descent is identical with that experienced with an uninterrupted continuously downward flow of solids.

The provision of the gas-collecting "pocket" or space 6 above the charge column in chamber 5 is an essential feature of the present process. The volume of space 6 should be ample, in relation to the volume of gas discharging from the charge column in chamber 5, to promote maximum uniformity of flow of gas through this column. Such ample space can be provided by positioning the refractory tube 7 in the top of chamber 5, the length of conduit 7 being sufficient to maintain the upper free surface of the lower charge column at a suitable distance from the conical top 8 of chamber 5. The connecting conduit 7, which I term herein the "isthmus," should be relatively small in cross-sectional area compared with the cross-sectional areas of chambers 5 and 16. In order to reduce the amount of gas flowing upwardly from chamber 5 to chamber 16 by way of this isthmus, the major portion of this gas stream may be diverted through conduit 9 to combustion chamber 10.

It should be noted that if substantial amounts of gas were to flow upwardly through conduit 7 into chamber 16, this portion of the gas would arrive at the bottom of the charge column 17 with a gas composition which would differ from the composition of the gas entering the column from annular open space 14. Were such short-circuited gas to leak from chamber 5 through isthmus 7 into chamber 16 in relatively large amount, objectionable irregularity in gas composition would be encountered, which irregularity would have an adverse effect on the efficiency of reduction in chamber 16. The exact dimensions of isthmus 7 will depend on the size of the ore particles being treated and on their physical characteristics: the diameter of isthmus 7 should be sufficiently large to avoid mechanical jamming of the material flowing therethrough.

In the drawing I have shown a mechanism for removing the finished solid product from the bottom of chamber 5. Ore leaves the inverted conical bottom of chamber 5 through discharge conduit 38, at a rate controlled by the speed of revolution of the impeller in star-gate 40. This star-gate is preferably actuated by a variable speed geared motor. The rate at which the ore material is moved through the duplex shaft furnace can thus be controlled by suitable adjustment in the speed of the star-gate motor. It is convenient to provide a shut-off valve 39 positioned in discharge conduit 38 whereby the flow of material therethrough can be completely stopped.

In order to attain maximum thermal efficiency for the present process, it is essential to realize a maximum uniformity of flow both in regard to the upward flow of gas in chambers 5 and 16 and in regard to the downward flow of solids in these chambers. Since the finished product moving through the hopper-bottom of chamber 5 is at a relatively low temperature, I generally prefer to install adjacent this hopper-bottom a plurality of inverted truncated cones 45, 45, made of sheet steel or of cast iron. These conical baffles are dimensioned, and positioned concentrically with respect to the cone of the hopper-bottom, whereby to promote uniformity of flow of solids in chamber 5. The device has long been known and its use is conventional. I have not shown similar conical baffles positioned in the conical bottom of upper chamber 16 since, in the more usual case, I do not recommend their use there. It is true that increased uniformity of solid flow (and therefore of gas flow) is promoted by such baffles, but, because of the higher temperature prevailing in the bottom of chamber 16, operating difficulties are sometimes encountered in maintaining these baffles in actual practice. I do not, however, disclaim the use of such baffles in upper chamber 16.

The operation of my present process can perhaps be best described in terms of specific examples.

Example 1

The starting material is a lean hematite ore which exhibits the following analysis, on a dry basis:

| | |
|---|---|
| $Fe_2O_3$ | 67.50 |
| $MnO_2$ | 0.22 |
| $P_2O_5$ | 0.08 |
| $SiO_2$ | 22.15 |
| $Al_2O_3$ | 4.43 |
| CaO | 0.41 |
| MgO | 0.18 |
| $CO_2$ | 0.47 |
| Combined water | 4.48 |
| Alkali | 0.08 |

| | |
|---|---|
| Moisture as received | 15.25 |

This ore contains 15.25% moisture as charged.

The apparatus as shown in the accompanying drawing has the following dimensions: upper chamber 16 has inside diameter of 20 feet and a vertical height between open space 14 and stockline 18 of 16 feet. Ore is charged at the rate of 1590 gross tons (G. T.) per 24-hour day. Blower 1 forces 14,430 cu. ft./min. (standard conditions, 60° F., 29.92 inches Hg.) of cold, clean spent carrier gas through cold gas conduit 2. This gas has the following composition:

| | | | |
|---|---|---|---|
| $CO_2$ | 21.68 | $H_2O$ | 4.05 |
| CO | 0.57 | $N_2$ | 73.64 |
| $H_2$ | 0.06 | | |

Reducing gas is forced through valved conduit 31 into conduit 2. This gas has the following composition:

| | | | |
|---|---|---|---|
| $CO_2$ | 0.62 | $H_2O$ | 0.36 |
| CO | 34.28 | $N_2$ | 62.80 |
| $H_2$ | 1.84 | | |

The above reducing gas may be, and preferably is, produced in a slagging type gas producer of the type described in my copending application Serial No. 695,914, to which reference is made. The recirculating carrier gas and the reducing gas commingle and flow into the bustle pipe 3 with the following gas composition:

| | | | |
|---|---|---|---|
| $CO_2$ | 18.11 | $H_2O$ | 3.46 |
| CO | 6.56 | $N_2$ | 71.51 |
| $H_2$ | 0.36 | | |

This "enriched carrier gas" flows at the rate of 17,393 cu. ft./min. upwardly through chamber 5, and, discharging through open space 6, flows through conduit 9 into combustion chamber 10. Fuel oil is forced through burner 35 at the rate of 4.38 gallons per minute, and 5860 cu. ft. of draft air is forced (by a draft blower, not shown) through bustle pipe 33 and blow pipes 34, 34 into auxiliary combustion chamber 37. The products of this fuel combustion commingle with the gas entering through conduit 9, attaining uniformity of composition in chamber 10, and discharge through conduit 11, with the following analysis:

| | | | |
|---|---|---|---|
| $CO_2$ | 16.71 | $H_2O$ | 6.42 |
| CO | 4.67 | $N_2$ | 71.94 |
| $H_2$ | 0.26 | | |

This thermally enhanced enriched carrier gas flows into bustle pipe 12 at the rate of 23,630 cu. ft./min., and passes by way of blow pipes 13, 13 into open space 14 and thence enters charge column 17 by passage under the inverted truncated concentric conical shield 15. As this gas ascends the descending ore column 17 reduction is effected in the lower portion of chamber 16, and the "spent gas" resulting from this reduction in passing through the ore in the neighborhood of stockline 18 dehydrates the combined water associated with the $Fe_2O_3$ and evaporates the moisture content of the ore. The water vapor removed in the present case is 9700 cu. ft./min. (measured at 60° F. and 29.92 in. Hg). The resulting wet spent gas discharging through open space 19 and discharge conduit 25 has the following analysis:

| | | | |
|---|---|---|---|
| $CO_2$ | 14.83 | $H_2O$ | 34.48 |
| CO | 0.16 | $N_2$ | 50.51 |
| $H_2$ | 0.02 | | |

This gas, after passage through dust collector 26, is cooled to about 85° F. by passage through scrubber 28 and the large amount of water evaporated from the ore is condensed therein and removed from the gas.

After cleaning and cooling the spent gas, I bleed through bleed main 30 about 8600 cubic feet per minute of such gas and return the remainder through conduit 43 to blower 1.

The evaporation of moisture from the ore and the dehydration of the material therein, in the present instance, absorb a large amount of heat, viz., 455,000 B. t. u. per minute. To a large extent, this absorption of heat is compensated by the production of 310,000 B. t. u. per minute of heat generated by the exothermic reduction of $Fe_2O_3$ to $Fe_3O_4$ by the combined action of the CO and the $H_2$ of the enriched carrier gas. The net thermal effect of these two factors, however, is that 145,000 B. t. u. per minute of heat are absorbed.

The fuel requirements of the process are largely dominated by the loss of heat experienced from discharging the spent gas through conduit 25, and the finished solid product through conduit 38, at temperatures above atmospheric. The spent gas discharges from open space 19 at 395° F., thus carrying away 230,000 B. t. u./min. The solids are discharged through conduit 38 at 510° F., corresponding to a heat loss of 151,000 B. t. u./min.; thus bringing the thermal requirements of the process up to 526,000 B. t. u./min. A considerable loss of heat through the bricklining of the two chambers and the combustion zone is experienced, amounting to 19,000 B. t. u./min. The total thermal input required to maintain the apparatus at a steady state is, therefore, 545,000 B. t. u./min.

It should be observed that the cooling effect of the enriched carrier gas ascending through the column in reaction chamber 5 is insufficient to cool the solid particles to a nearer approach to atmospheric temperature than the 510° F. indicated above, due to the excess heat capacity of the solids above the 17,000 cu. ft./min. of gas ascending therethrough. It is, of course, possible to increase the amount of recirculating carrier gas, thereby reducing the temperature of the solids discharged through conduit 38 and thereby decreasing the loss of heat due to the discharge of heated solids. However, when the volume of recirculated gas is increased with the same flow of solids through the apparatus, the heat capacity of the gas traversing upper chamber 16 exceeds the amount of heat required to heat the solids descending therethrough and the temperature of the gas discharging from stockline 18 is increased. Considerable latitude is permissible in regulating the amount of carrier gas which is recirculated per ton of ore charged. The requirements for maximum thermal efficiency are: (1) the amount of reducing gas introduced through conduit 31 shall be proportioned with respect to the iron content of charged material and to the degree of conversion from $Fe_2O_3$ to $Fe_3O_4$ which is desired, whereby to attain a high efficiency of utilization of the reducing gas; and (2) the amount of fuel introduced through burner 35 and of draft through bustle pipe 33 shall be proportioned so that complete combustion of the fuel will be realized without remanent excess of oxygen or of unburned combustibles.

With regard to requirement "1" above, if more CO and/or $H_2$ is introduced through conduit 31 in enriching the carrier gas than is required to effect the conversion of all the ferric oxide in the ore to magnetite, the excess CO and $H_2$ will remain unoxidized and will be discharged through exhaust conduit 25, thus wasting the excess reducing agent.

In the above illustration, the reducing gas employed is the product of a slagging type gas producer and the fuel is a petroleum liquid. This selection of reducing gas and fuel is appropriate to operations carried out at an iron mine, e. g., in the Lake Superior region, distant from sources of natural gas, coal and coke and other industrial fuels. Whenever the ore mine is located near a blast furnace and steel plant, it may be advantageous to use producer gas both as reducing agent and as fuel. Where natural gas is available, this natural gas may readily enough be used as fuel, and the reducing gas may readily enough be relatively pure $H_2$ obtained by the thermal decomposition of the natural gas. Innumerable combinations of reducing gas and fuel appear appropriate, depending on the geographical location and character of the ore to be treated.

*Example 2*

An economically significant application of my process is the treatment of low grade taconites occurring in vast quantities in Northern Minnesota. Of these minerals, many economically important ones are non-magnetic as mined; if magnetically roasted it has been found that their concentration is readily achieved by magnetic separation methods. The analysis of a representative, naturally non-magnetic taconite is:

| | |
|---|---|
| $Fe_2O_3$ | 45.92 |
| $MnO_2$ | 0.12 |
| $P_2O_5$ | 0.02 |
| $SiO_2$ | 50.27 |
| $Al_2O_3$ | 0.52 |
| CaO | 0.09 |
| MgO | 0.05 |
| $CO_2$ | 0.11 |
| Combined water | 2.85 |
| Alkali | 0.05 |
| Moisture as received | 3.15% |

I employ apparatus as shown in the drawing in which reaction chamber 16 is 25 feet inside diameter, with 18 feet as the height of charge column 17. The inside diameter of the lower chamber 5 is 31 feet and the vertical height from annular space 4 to open space 6 is 12 feet. Blower 1 recirculates 50,000 cu. ft./min. of spent carrier gas which is enriched, before entering bustle pipe 3, by the addition thereto of 5000 cubic feet of slagging type gas producer gas of the analysis given in Example 1 above. The resulting enriched carrier gas contains 3.1% CO and something above 19% $CO_2$ with a ratio of $CO_2$-to-CO greater than 6. Such a gas is oxidizing to FeO at all temperatures between atmospheric and 2000° F. In the present example, due to the character of the taconite material, I so operate combustion zone 10 as to maintain a temperature of 1200° F. in bustle pipe 12. In order to maintain such a temperature, I introduce, through burner 35, 2.65 gallons per minute of fuel oil (density 0.81) thereby generating 340,000 B. t. u./min. In order to supply sufficient oxygen for the combustion of this fuel I introduce, through conduit 32, 3600 cubic feet per minute of draft air.

On stockline 18 I charge 3600 G. T. of the taconite per 24 hours; and through conduit 38, in the same period, 3260 G. T. of finished product having the following analysis:

| | | | |
|---|---|---|---|
| $Fe_3O_4$ | 46.41 | $Al_2O_3$ | 0.54 |
| MnO | 0.10 | CaO | 0.09 |
| $P_2O_5$ | 0.02 | MgO | 0.08 |
| $SiO_2$ | 52.73 | Alkali | 0.05 |

In this example, I am charging 1700 lbs. per minute of Fe combined with 730 lbs. per minute of oxygen in the form of ferric oxide. Concurrently, I am introducing 1600 cubic feet per minute of reducing agent (CO plus $H_2$). If this reducing reagent were used with perfect efficiency it would remove 77 lbs. of oxygen per minute. In this particular example, the oxygen actually removed is 71 lbs. per minute. In order to convert to magnetite all of the iron in the taconite it would be necessary to remove 81 lbs. of oxygen per minute. It would seem, therefore, that the actual conversion is only 87%. I have found that in many cases it is not necessary to convert the iron oxide completely to magnetite in order to attain satisfactory magnetic concentration. The tolerable amount of this incompleteness of reduction will, of course, vary with the character of the ore material treated. If it were desired to effect complete conversion to magnetite it would be necessary only to increase the influx of reducing gas through conduit 31 to 5750 cu. ft./min. in the above example.

It should be noticed that over-reduction, e. g., conversion of $Fe_3O_4$ to FeO, produces a product which is less magnetic than ferric oxide itself. I have found, however, that good magnetic concentration can be effected with 115% reduction, i. e., 15% over-reduction. It is permissible, therefore, within the meaning of my present process, to increase the flow of reducing gas through conduit 31 to as high as 6612 cubic feet per minute. When this is done, the product consists largely of magnetite contaminated with FeO (which is non-magnetic), but the degree of reduction is not adversely effected to such an extent that magnetic concentration cannot be achieved.

Although the present process is primarily directed to the conversion of non-magnetic iron oxide to a magnetic product, the thermal analysis of the furnace treatment indicates that the major fuel requirement is dominated largely by the moisture content of the ores treated. In many cases I have found it technically desirable and economically profitable to dry the ore material without conversion to a magnetic product in a separate operation prior to treatment according to the presently described process. In this initial drying step, I frequently prefer to use the types of furnaces which I have described in my copending applications Serial Nos. 602,988, 605,861, and 695,914, or with the apparatus described in the copending application of Charles S. Arms, Serial No. 626,334, now abandoned.

It should be observed that in the apparatus herein described and in the two examples given above, the ore after thermal treatment in the upper chamber 16 is removed therefrom and introduced into the lower chamber 5, wherein it is cooled. This transfer of solid materials from chamber 16 to chamber 5 is, in the apparatus described and illustrated, realized by the simple device of feeding the ore material directly from the hopper-bottom of chamber 16 onto the conical stockline in chamber 5 by gravitational flow through isthmus 7. This is a satisfactory and simple method of transferring the solids. There is no inherent reason, however, why this gravitational flow through a restricted refractory lined conduit should be used. The two chambers 16 and 5 might be placed side by side at any convenient distance and at any convenient relative levels: the hot solids removed from the bottom of chamber 16 may readily be transferred laterally, vertically, or otherwise, in a suitable container, or by a suitable bucket conveyor or other device, and recharged into the top of chamber 5.

Although the term "magnetic roasting of iron ore" usually signifies a reduction process wherein $Fe_2O_3$ is reduced to $Fe_3O_4$, it also includes, of course, the operation of oxidizing FeO to $Fe_3O_4$. An example of such an operation is the treatment of siderite ores containing $FeCO_3$. When heated below red heat, iron carbonate decomposes thermally into FeO and $CO_2$. The solid calcined product, containing iron in the ferrous oxide condition, is non-magnetic. When such a sideritic ore is treated according to the present process, the $CO_2$ of the $FeCO_3$ is driven off from the ore in the upper chamber, and the solid residual FeO is oxidized by the carrier gas traversing the ore mass therein according to the equation:

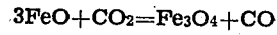
$$3FeO + CO_2 = Fe_3O_4 + CO$$

A second example of oxidizing magnetic roast is the case of a silicate rock containing $FeSiO_3$. When ferrous silicate is subjected to the reactive effect of the carrier gas in the present process, containing as it does a high ratio of $CO_2$-to-CO, the silicate is oxidized to $Fe_3O_4$ plus $SiO_2$, the two oxides forming neither a chemical compound nor a solid solution. On the contrary, the oxidized silicate, at the elevated reactive temperature, forms separate oxides (quartz and magnetite) which may yield a roasted product amenable to magnetic separation.

A third example of an oxidizing magnetic roast is blast furnace flue dust which is frequently a low grade ferruginous product running much higher in contaminants than the ore fed into the blast furnace. Frequently I prefer to agglomerate blast furnace flue dust into briquettes, pellets, or nodules, and then treat them by the present magnetic roasting process, to oxidize the "over reduced" iron oxide of the flue dust (non-magnetic FeO) to $Fe_3O_4$, and thereafter to grind and magnetically separate the roasted product.

In general, the chemical effect of the reactive gas forced to traverse the chambers employed in carrying out my process is to convert iron, in its two non-magnetic states of oxidation, $Fe_2O_3$ and FeO, into one of its two magnetic states, $Fe_3O_4$ and Fe. In its broadest aspect, this would involve three alterations in the oxygen content of the iron constituent of the solid: (1) $Fe_2O_3$ altered to $Fe_3O_4$ by reduction, (2) FeO altered to $Fe_3O_4$ by oxidation, and (3) FeO altered to Fe by reduction. Since the oxygen shift involved in step "3" is three times as great as the shift involved in step "2," I prefer to limit my process to converting FeO to magnetic $Fe_3O_4$ rather than to magnetic metallic Fe.

I claim:

1. In the magnetic roasting of ferruginous ore material whose iron content consists mostly of one or more relatively non-magnetic oxidic compounds of iron, to convert the major portion of the iron content thereof to magnetite by treating a mass of the ore material with a reactive gas, the improvements which consist in establishing and maintaining a gravitationally descending column of particles of the ore material in initially substantially unheated state; passing upwardly through an upper part of said column a current of a reactive gas initially containing $CO_2$ and a gaseous reducing agent of the group consisting of CO and $H_2$ but no free oxygen, said reactive gas being initially at an elevated temperature below the liquidus temperature of the non-magnetic oxidic compound of iron, the volume of said reactive gas, about 10 cubic feet per each 1 pound of the ore material treated, being such that the heat capacity of said reactive gas is equivalent to the heat capacity of said ore material, the gaseous reducing agent component of the reactive gas being present in an amount of from about 1.0 to about 1.37 cubic feet per each 1 pound of iron contained in the ore material, and the $CO_2$ and gaseous reducing agent being present in such relative proportions that the gas at the temperature of operation is reducing with respect to $Fe_2O_3$, is oxidizing with respect to FeO and Fe and is in thermodynamic equilibrium with $Fe_3O_4$, during which countercurrent treatment the ore material is dehydrated and heated to reactive temperature and thereupon its content of non-magnetic oxidic compound of iron largely is converted to magnetite; wasting to atmosphere a fractional portion of the gas after it has passed through the upper part of said column, and cooling the residual gas; re-establishing the initial ratio of $CO_2$ to gaseous reducing agent and the initial volume of the reactive gas by adding to the residual gas a reducing gas relatively rich in said gaseous reducing agent; introducing the resulting re-constituted reactive gas, in initially substantially unheated state, into said column at a level adjacent the bottom of the latter and passing the gas upwardly through the lower part of said column whereby to abstract heat from the particles constituting the latter; withdrawing the gas from the column at a level intermediate the top and the bottom of the latter and below the level of introduction of heated reactive gas into said column; thermally enriching the gas while maintaining its chemical composition substantially unchanged; and using the thermally enriched reactive gas in a repetition of the defined gas cycle.

2. In the magnetic roasting of ferruginous ore material whose iron content consists mostly of one or more relatively non-magnetic oxidic compounds of iron, to convert the major portion of the iron content thereof to magnetite by treating a mass of the ore material with a reactive gas, the improvements which consist in causing a body of the ore material gravitationally to descend through a first chamber and a second chamber in series; countercurrently passing through the body of the ore material in said first chamber a reactive gas initially containing $N_2$, $CO_2$ and a gaseous reducing agent consisting essentially of CO but no free oxygen, said reactive gas being initially at an elevated reactive temperature below the liquidus temperature of the non-magnetic oxidic compound of iron, the CO being present in an amount of from about 1.0 to about 1.37 cubic feet per each 1 pound of iron contained in the ore material and the $CO_2$ and gaseous reducing agent being present in such relative proportions that the gas at the temperature of operation is reducing with respect to $Fe_2O_3$, is oxidizing with respect to FeO and Fe and is in thermodynamic equilibrium with $Fe_3O_4$, the volume of the reactive gas being such that the heat capacity thereof is equivalent to the heat capacity of the ore material being treated, during which countercurrent treatment the ore material is dehydrated and heated to elevated reactive temperature and thereupon its content of non-magnetic oxidic compound of iron largely is converted to magnetite; wasting to atmosphere a fractional portion of the gas after it has passed through said body, and cooling the residual gas; re-establishing the initial ratio of $CO_2$ to gaseous reducing agent and the initial volume of the reactive gas by adding to the residual gas a reducing gas relatively rich in said gaseous reducing agent; passing the resulting re-constituted reactive gas, initially substantially unheated, countercurrently through the body of heated ore material in said second chamber whereby to abstract heat from said body; withdrawing the reactive gas after it has traversed the body of ore material in said second chamber; thermally enriching the reactive gas to elevated reactive temperature by burning therein a combustible fuel with an amount of combustion air controlled to provide only that amount of oxygen necessary to effect substantially complete combustion of the combustibles of the fuel; and using the thermally enriched reactive gas as said reactive gas in a repetition of the defined gas cycle.

3. In the magnetic roasting of hematitic ore materials to convert at least a major portion of the ferric oxide content thereof to magnetite by treating a mass of the ore material with a reactive gas, the improvements which consist in causing a body of the ore material gravitationally to descend through a first chamber and a second chamber in series; countercurrently passing through the body of ore material in said first chamber a reactive gas initially at elevated reactive temperature below the liquidus point of said ore material, the volume of said reactive gas, about 10 cubic feet per each 1 pound of ore material treated, being such that the heat capacity of the reactive gas is equivalent to the heat capacity of the ore material being treated, said reactive gas initially containing $CO_2$ and a gaseous reducing agent of the group consisting of CO and $H_2$ but no free oxygen, the gaseous reducing agent component of the reactive gas being present in an amount of from about 1.0 to about 1.37 cubic feet per each 1 pound of iron contained in the ore material and the $CO_2$ and gaseous reducing agent being present in such relative proportions that the reactive gas at the temperature of operation is in thermodynamic equilibrium with iron oxide in the $Fe_3O_4$ state only; wasting to atmosphere a minor fractional portion of the gas after it has passed through said body, re-establishing the initial ratio of $CO_2$ to gaseous reducing agent and the initial volume of the gas by adding to the residual gas as such a reducing gas relatively rich in gaseous reducing agent; passing the resulting re-constituted reactive gas, initially at a relatively low temperature, countercurrently through the body of heated ore material in said second chamber; withdrawing the reactive gas after it has traversed the body of ore material in said second chamber; thermally enriching the reactive gas; and using the thermally enriched gas as the reactive gas in a repetition of the defined gas cycle.

PERCY H. ROYSTER.

(References on following page)

REFERENCES CITED

The following references are of record in the file of this patent:

UNITED STATES PATENTS

| Number | Name | Date |
|---|---|---|
| 1,317,327 | Shoeld | Sept. 30, 1919 |
| 1,937,822 | Jones | Dec. 5, 1933 |
| 2,107,549 | Schmalfeldt | Feb. 8, 1938 |
| 2,199,384 | Azbe | May 7, 1940 |
| 2,204,576 | Davis | June 18, 1940 |
| 2,296,522 | Hartley | Sept. 22, 1942 |
| 2,333,111 | Lykken | Nov. 2, 1943 |
| 2,345,067 | Osann | Mar. 28, 1944 |

OTHER REFERENCES

Journal of the American Chemical Society, vol. 44 (1922), pages 987–990.

"Comprehensive Treatise on Inorganic and Theoretical Chemistry," by Mellor, 1934, vol. 13, page 738.

Bulletin of the Univ. of Minnesota #13 (1937), pages 28–31, "Magnetic Roasting of Iron Ore."